United States Patent [19]

Lebecque

[11] 4,440,324

[45] Apr. 3, 1984

[54] CARTRIDGE-TYPE DISPENSER GUN

[76] Inventor: Maurice Lebecque, 7849 Bloomfield St., Apt. 3, Montreal, Quebec, Canada, H3N 2H4

[21] Appl. No.: 385,309

[22] Filed: Jun. 4, 1982

[51] Int. Cl.³ .......................... B67D 5/42; B67D 5/46
[52] U.S. Cl. ...................................... 222/326; 74/142; 74/404; 74/202; 222/333; 222/386; 222/336
[58] Field of Search .......................... 74/142, 404, 202; 604/208–210; 401/176, 179, 181; 222/333, 340, 222, 386, 391, 387, 392, 326, 327, 336

[56] References Cited

U.S. PATENT DOCUMENTS

| | | | |
|---|---|---|---|
| 679,983 | 8/1901 | O'Neil | 222/391 |
| 2,118,154 | 5/1938 | Buedingen | 222/386 |
| 2,313,213 | 3/1943 | Atherley | 222/386 |
| 3,604,597 | 9/1971 | Pohl et al. | 222/333 |
| 4,330,070 | 5/1982 | Doubleday | 222/391 |
| 4,335,834 | 6/1982 | Zepkin | 222/333 |

*Primary Examiner*—H. Grant Skaggs

[57] ABSTRACT

A dispensing gun of the type holding a cartridge to push a substance out of it and characterized by using a longitudinally arc-shaped cartridge for a more compact operation and construction, by conveniently using a wheel drive to provide improved leverage or multiplication of the force deployed by the user, and by providing more steady piston pressure and dispensing an effortless retraction of the piston under spring action. This dispensing gun includes a longitudinally arc-shaped cartridge chamber, a piston with a similarly arc-shaped piston rod, a pawl and ratchet assembly to provide stepwise advance of the piston, a hand-controlled actuation assembly connected to the ratchet wheel and piston to push the piston against the movable bottom of the cartridge, and a spring to retract the piston upon release of the pawl and ratchet assembly.

15 Claims, 5 Drawing Figures

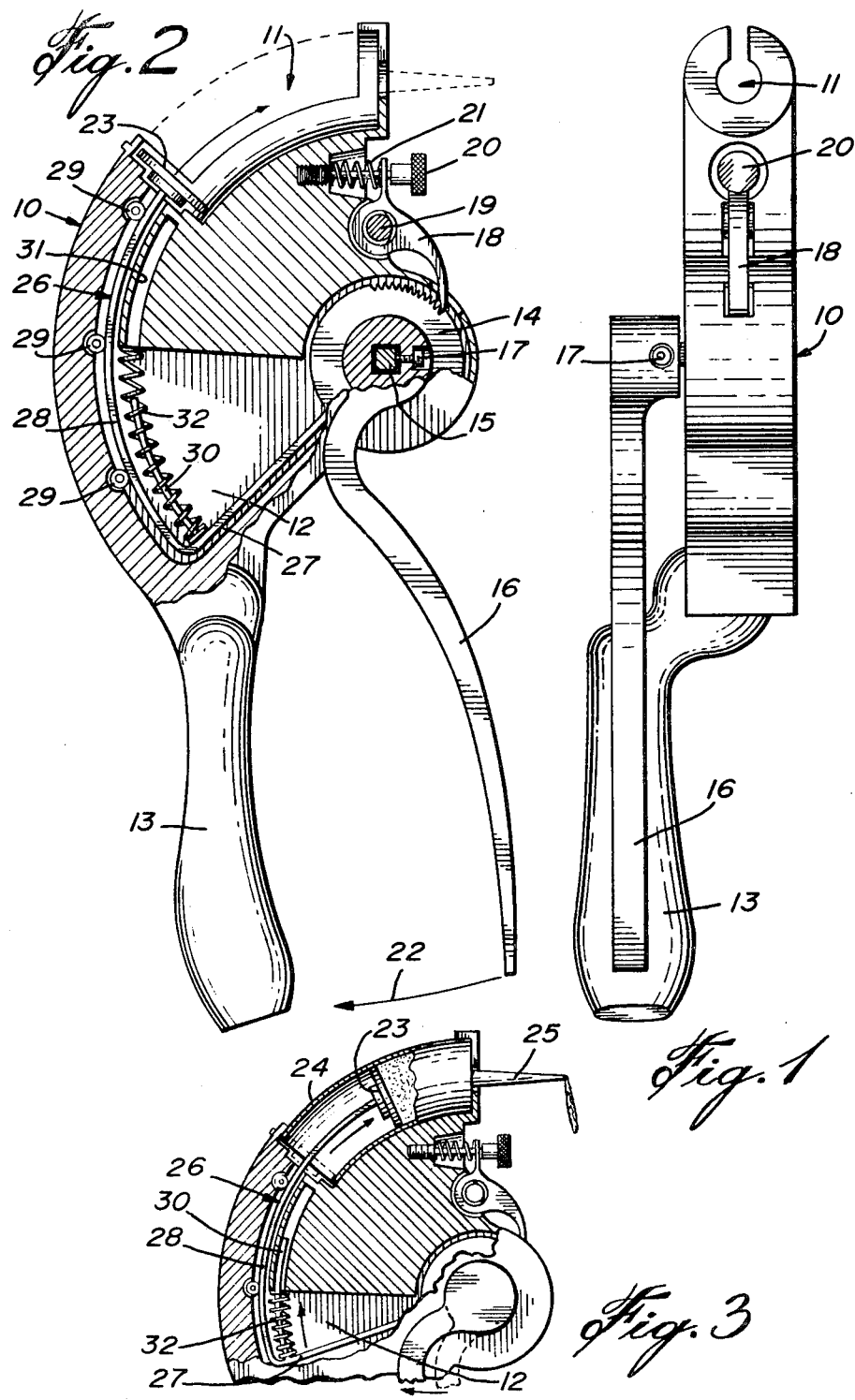

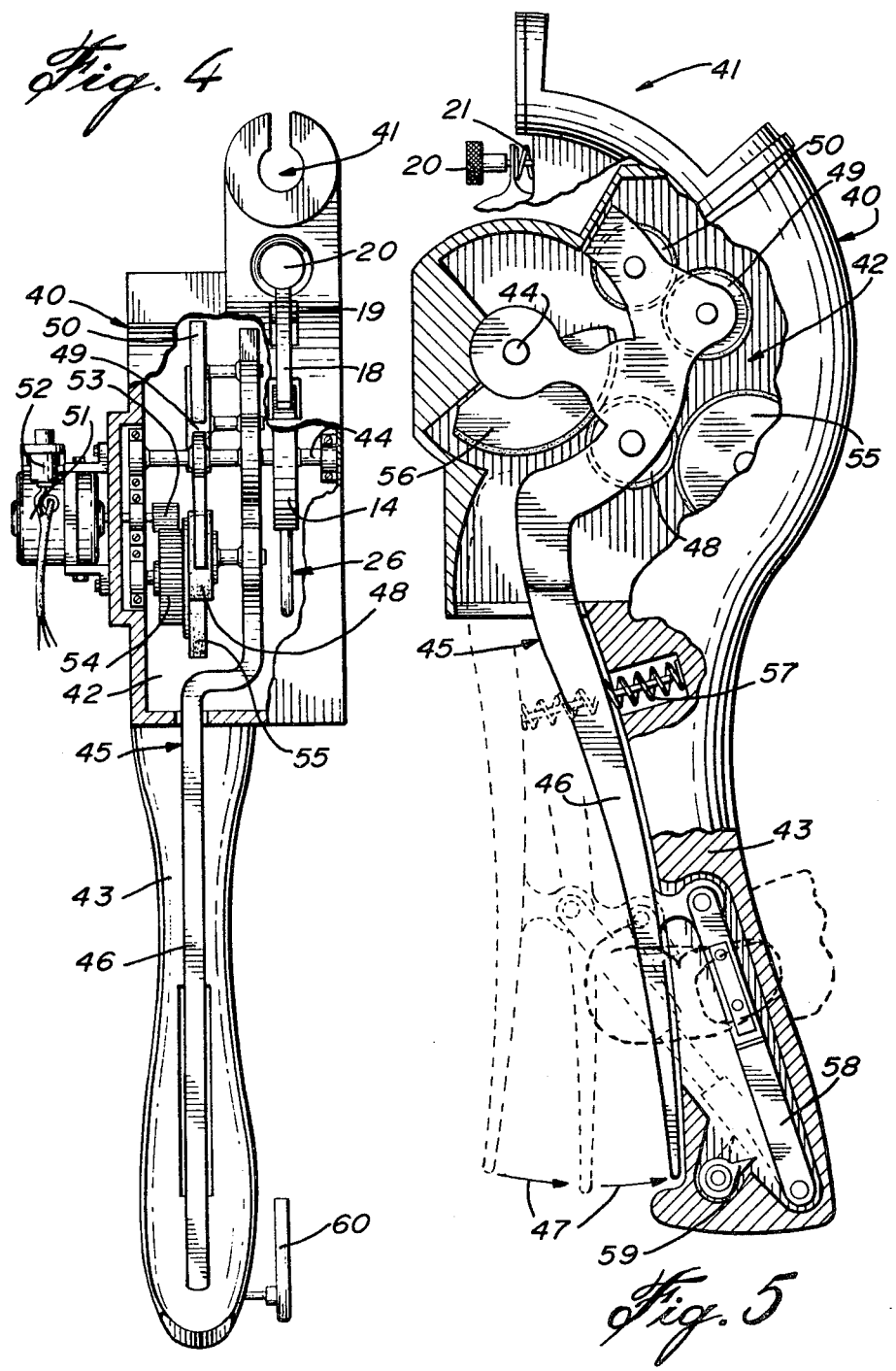

CARTRIDGE-TYPE DISPENSER GUN

FIELD OF THE INVENTION

This invention relates to a dispensing gun of the type holding a cartridge to dispense a substance from it. Such gun is conventionally used for caulking and can be used for greasing machinery and for frosting cakes.

DESCRIPTION OF THE PRIOR ART

The dispenser guns of the cartridge type have so far been made to operate with a straight or rectilinear cartridge, using straight line displacement of the piston pushing the substance out of the cartridge. In such dispensing guns, the force to push the material out of the cartridge is limited by the leverage that can be given by the actuation lever. Another disadvantageous aspect comes from the linear operation and construction requiring very substantial space to be satisfactorily operated and even to be used. With such guns of linear operation, the piston is retracted by hand, often requiring a substantial expense of energy.

SUMMARY OF THE INVENTION

It is a general object of the present invention to provide a cartridge-type dispenser gun that requires less space for operation compared to the dispenser gun of the linear type.

It is another general object of the present invention to provide a cartridge-type dispenser gun that provides a cartridge-type dispenser gun that provides a better leverage or multiplication of the force deployed by the user and thus requires less force to push the substance out of the cartridge.

It is a further general object of the invention to provide a cartridge-type dispenser gun that provides a more steady piston pressure.

It is a more specific object of the present invention to provide a cartridge-type dispenser gun that uses a longitudinally arc-shaped cartridge to be of more compact operation and construction.

It is another object of the present invention to provide a cartridge-type dispenser gun that compactly and efficiently uses rotary movement and multiplication of forces for easier operation and dispensing of the substance out of the cartridge.

It is a further object of the present invention to provide a cartridge-type dispenser gun wherein retraction of the piston is effortlessly done by spring action.

BRIEF DESCRIPTION OF THE DRAWINGS

The above and other objects and advantages of the present invention will be better understood with reference to the following detailed description of preferred embodiments thereof, which are illustrated, by way of example, in the accompanying drawings, in which:

FIG. 1 is a front view of a cartridge-type dispenser gun according to one embodiment of the invention manually operated by a lever;

FIG. 2 is a cross-sectional view of the dispenser gun of FIG. 1;

FIG. 3 is a partial view of FIG. 2, particularly indicating the mode of operation of certain parts of the dispenser gun of FIGS. 1 and 2;

FIG. 4 is a front view with parts broken away of a cartridge-type dispenser gun according to a second embodiment of the present invention; and FIG. 5 is a side view with parts broken away of the dispenser gun of FIG. 4.

The cartridge-type dispenser gun illustrated in FIGS. 1, 2, and 3 includes a body 10 defining a longitudinally arc-shaped cartridge chamber 11 and a piston rod chamber 12. The main portion of the body 10, defining the chambers 11 and 12, has the general form of a sector and is integrally formed with a portion 13 forming a fixed handle. Coaxial with the sector-shape portion, there is mounted a ratchet wheel 14, of a pawl and a ratchet wheel assembly. The ratchet wheel 14 is rotatively mounted in the body by stub axles, one of which, namely stub axle 15, outwardly projects from the body 10 on one side of it. A manually-controlled handle, or lever 16, is secured on the stub axle 15 by a setscrew 17 for bodily rotation with the ratchet wheel 14. The latter is provided with teeth along a portion of its circumference. A pawl 18 is pivoted at 19 parallel to the axis of the ratchet wheel 14. The pawl is formed with a projection to engage the teeth of the ratchet wheel and with another projection through which is engaged the stem of a push button 20. A compression spring 21 releasably biases the pawl 18 into engagement with the teeth of the ratchet wheel 14. Thus, as the lever 16 is progressively pivoted in the direction of the arrow 22 toward the fixed handle 13, the ratchet wheel 14 bodily rotates with it and the pawl 18 stepingly engages the teeth of the ratchet wheel.

A piston 23 is displaceable longitudinally of the cartridge chamber 11 inside the cartridge 24 to expel its flowable substance through its nozzle 25. A piston rod 26 is secured to the piston 23 at its outer end and to the ratchet wheel 14 at its inner end. The piston rod 26 includes a radially-projecting inner end portion 27 and a longitudinally arc-shaped outer end portion 28 extending co-axial with the longitudinally arc-shaped axis of the cartridge chamber 11 and cartridge 24. Guide rollers 29 are arranged in the body 10 to guide the portion 28 relative to the cartridge 24 to properly push the piston in it. A spring-guiding pin 30 projects in the body 10 parallel to the outer end portion 28 and is arcuately aligned with an aperture 31 into which it engages when the piston 23 progresses into the cartridge chamber 11. A return spring 32 is engaged around the spring-guiding pin 30 to act in compression against the piston rod 26 to retract the piston 23 when the pawl 18 releases the teeth of the ratchet wheel 14 upon pushing of the push button 20.

The cartridge-type dispenser gun illustrated in FIGS. 4 and 5 is provided with elements similar to some elements of the aforedescribed dispenser gun and those elements will be identified by the same reference numerals as in FIGS. 1, 2, and 3.

The dispenser gun in FIGS. 4 and 5 includes a body 40 having a main portion defining a longitudinally arc-shaped cartridge chamber 41 and a chamber 42 for a clutch and associated drive and control elements. The body 40 is formed with a depending fixed handle portion 43. As in the embodiment of FIGS. 1, 2, and 3, the dispenser gun of FIGS. 4 and 5 includes a ratchet wheel and pawl assembly including the elements 14, 18, 19, 20, and 21 and also includes the piston and piston rod assembly including the elements 23, 26, 27, 28, 29, 30, 31, and 32. The ratchet wheel 14 is fixedly mounted on a main shaft 44 that is journalled at its opposite ends in the body 40 and extends transversely of it.

A manually-controlled lever 45 is pivoted on the main shaft 44 and has a handle portion 46 outwardly extending from the body 40 and pivotable, as shown by the arrows 47, toward the fixed handle portion 43. The lever 45 is adapted to control a clutch mechanism that includes three frictional contact wheels 48, 49, and 50. The latter will be better described in details later.

An electric motor 51 is secured against one side of the body 40 and is connected to drive the sprocket wheel 14, as will now be described. The motor 51 is controlled by an on-off switch 52. The electric motor drives a pinion 53 in meshing engagement with a larger gear 54. The latter bodily rotates with a frictional contact wheel 55. A sector 56 of a frictional contact wheel is fixedly secured on the main shaft 44 to bodily rotate with it and, thus, also with the ratchet wheel 14.

The pivoting of the lever 45 about the shaft 44 allows to either engage wheel 48 or 49 with the wheel 55 or to engage neither when the lever is in an intermediate position; that is, with the frictional contact wheel 55 positioned between the wheels 48, 49, and touching neither. The innermost position of the lever 45 causes engagement of the wheel 48 with the wheel 55, and this drives the wheel sector 56 and the ratchet wheel 14 to move the piston forward and, thus, expel the substance from the cartridge. On the other end, the outermost position of the lever 45 causes engagement of the wheel 49 with the wheel 55 and, through wheel 50, this drives the wheel sector 56 in reverse to retract the piston from the cartridge in conjunction with release of the pawl by the push button 20, as aforementioned with reference to the manually-operated dispenser gun. When the lever 45 is in intermediate position, neither of the wheels 48 and 49 is engaged and the clutch mechanism is in neutral or idle drive position.

A compression spring 57 engages the lever 45 and urges the same toward the reverse drive position, such that no substance is dispensed from the cartridge unless the lever is intentionally squeezed toward the fixed handle 43. The lever 45 is pivotally connected to the fixed handle portion 43 by a link 58. A stopping needle 59 is selectively rotatable in the fixed handle portion 43 by a setting lever 60. The stopping needle 59 may thus be angularly set, as shown in FIG. 5, to stop the link 58 in its intermediate position, thus also holding the lever 45 in its intermediate position under the bias of the spring 57.

It must be noted that the wheels 55 relative to the wheels 48 and 49, the wheels 48 and 50 relative to the wheel sector 56 and the pinion 53 relative to the gear 54 may be diametrically related to provide very substantial leverage or multiplication, thus achieving a very steady displacement of the piston and flow of the substance out of the cartridge.

What I claim is:

1. A cartridge-type dispenser gun comprising a body defining a longitudinally arc-shaped cartridge chamber, a hand-controlled actuation assembly operatively connected to said body, a piston connected to the actuation assembly and displaceable longitudinally in the cartridge chamber, a pawl and ratchet assembly connected to the hand-controlled actuation assembly and stepingly holding the piston in advanced position in the cartridge chamber, and spring means connected to the piston and operatively retracting the same in the cartridge chamber upon release of the pawl and ratchet assembly.

2. A cartridge-type dispenser gun as defined in claim 1, wherein said piston is attached to a longitudinally arc-shaped piston rod.

3. A cartridge-type dispenser gun as defined in claim 2, wherein the hand-controlled actuation assembly includes a lever pivoted to said body and operatively controlling the operation of the pawl and ratchet assembly.

4. A cartridge-type dispenser gun as defined in claim 3, wherein the body includes a main body portion and a fixed handle portion projecting from the main body portion and said lever is pivoted to said body toward and away relative to the fixed handle portion.

5. A cartridge-type dispenser gun as defined in claim 3, wherein said pawl and ratchet assembly includes a ratchet wheel fixedly secured to the lever and to the piston rod for bodily rotation therewith.

6. A cartridge-type dispenser gun as defined in claim 5, wherein the ratchet wheel is rotatively mounted in said body coaxially with the arc-shaped curvature of the cartridge chamber.

7. A cartridge-type dispenser gun as defined in claim 6, wherein the ratchet wheel is mounted on a stub axle and the lever is fixedly connected to the stub axle.

8. A cartridge-type dispenser gun as defined in claim 2, 3 or 7, wherein guide rollers guidably engage the longitudinally arc-shaped piston rod and guide the same arcuately into the arc-shaped cartridge chamber.

9. A cartridge-type dispenser gun as defined in claim 2, 3 or 7, wherein the spring means includes a compression spring mounted in said body in abutment against the piston rod.

10. A cartridge-type dispenser gun as defined in claim 1, 2 or 7, wherein the pawl and ratchet wheel assembly includes a pawl, a spring engages the pawl and operatively biases the same toward operative engagement with the teeth of the ratchet wheel.

11. A cartridge-type dispenser gun as defined in claim 1, 2 or 7, wherein the pawl and ratchet wheel assembly includes a pawl, a spring engages the pawl and operatively biases the same toward operative engagement with the teeth of the ratchet wheel, and a push button is connected to the pawl and allows pivoting thereof against the bias of said spring engaging the pawl.

12. A cartridge-type dispenser gun as defined in claim 3, wherein the hand-controlled actuation assembly includes an electric motor and a clutch operatively connecting the electric motor to the pawl and ratchet assembly, and the lever is connected to the clutch and selectively operates the same and displaces the piston through the pawl and ratchet assembly.

13. A cartridge-type dispenser gun as defined in claim 12, wherein the lever is pivotable between a forward and a reverse drive positions and an intermediate neutral position, a catch is mounted on the body and selectively and operatively holds the lever and the clutch in neutral position, and the electric motor and the clutch are constructed and arranged to release the pressure on the piston in the neutral position of the clutch.

14. A cartridge-type dispenser gun as defined in claim 13, wherein a control link pivotally connects the lever to said body and is constructed and arranged to determine the outward and reverse drive position of the lever and the catch selectively intercepts the control link and holds the same in the intermediate neutral position.

15. A cartridge-type dispenser gun as defined in claim 14, wherein at least one speed-reducing drive serially connects with the clutch intermediate the electric motor and the pawl and ratchet assembly.

* * * * *